(12) United States Patent
Hu et al.

(10) Patent No.: US 9,215,609 B2
(45) Date of Patent: Dec. 15, 2015

(54) METHOD AND SYSTEM FOR MEASURING WIRELESS LINK QUALITY

(71) Applicant: Aruba Networks, Inc., Sunnyvale, CA (US)

(72) Inventors: Bo Hu, Beijing (CN); Kangchang Huang, Beijing (CN); Guangzhi Ran, Beijing (CN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 200 days.

(21) Appl. No.: 13/653,278

(22) Filed: Oct. 16, 2012

(65) Prior Publication Data

US 2014/0105058 A1    Apr. 17, 2014

(51) Int. Cl.
*H04W 24/08* (2009.01)

(52) U.S. Cl.
CPC ..................................... *H04W 24/08* (2013.01)

(58) Field of Classification Search
CPC .. H04W 24/08; H04W 24/06; H04W 28/0236
USPC .............. 370/241, 252, 253, 229, 230, 230.1, 370/232; 375/240, 240.02
See application file for complete search history.

(56) References Cited

U.S. PATENT DOCUMENTS

| | | | |
|---|---|---|---|
| 2007/0086529 A1* | 4/2007 | Krishnasawamy et al. | 375/241 |
| 2009/0097409 A1* | 4/2009 | Akhter et al. | 370/252 |
| 2012/0076199 A1* | 3/2012 | Gao et al. | 375/240.02 |
| 2012/0106362 A1* | 5/2012 | Reumerman et al. | 370/252 |

* cited by examiner

*Primary Examiner* — Un C Cho
*Assistant Examiner* — Siming Liu
(74) *Attorney, Agent, or Firm* — Kilpatrick Townsend & Stockton LLP (57) ABSTRACT

The present disclosure discloses a method and network device for measuring wireless link quality. The disclosed network device retrieves a plurality of packet transmission data corresponding to a plurality of transmission rates at which packets are transmitted over a wireless link between two wireless nodes in a wireless network. The network device also determines a wireless link quality metric value corresponding to the wireless link at least based on at least an average throughput associated with the plurality of transmission rates. The wireless link quality metric value can be further based on a maximum throughput corresponding to a hardware component in at least one of the two wireless nodes. The wireless link quality metric value can be used in monitoring or managing the wireless network.

30 Claims, 9 Drawing Sheets

| TRANSMIS-SION RATE (Mbps) 610 | VALID THROUGHPUT (Mbps) 620 | LINK QUALITY (%) 630 | EXPECTED THROUGHPUT (Mbps) 640 | REAL THROUGHPUT (Mbps) 650 |
|---|---|---|---|---|
| 6 | 5.20 | 16 | 4.48 | 5.14 |
| 9 | 7.40 | 24 | 6.72 | 7.10 |
| 12 | 9.40 | 31 | 8.68 | 8.90 |
| 18 | 13.40 | 49 | 13.72 | 15.90 |
| 24 | 16.80 | 56 | 15.68 | 17.30 |
| 36 | 21.80 | 75 | 21.00 | 22.80 |
| 48 | 26.00 | 84 | 23.52 | 24.70 |
| 54 | 28.00 | 93 | 26.04 | 27.70 |

METHOD AND SYSTEM FOR MEASURING WIRELESS LINK QUALITY

FIELD

The present disclosure relates to wireless link quality measurement in wireless networks. In particular, the present disclosure relates to improved estimation of link quality for a wireless link between two wireless nodes when the wireless link environment changes in a wireless network.

BACKGROUND

Wireless networks aim to provide reliable connectivity for user and high end-to-end throughput performance. Routing is one of the most important factors affecting connectivity and throughput in wireless networks, especially in multi-hop wireless mesh networks. Routing establishment depends on metric values associated with each routing path. The metric typically considers many comprehensive factors, such as hop count, delay time, and link quality. For a wireless network, the hop count and the delay time are relatively easy to measure. On the other hand, the link quality is complicated and difficult to measure, because wireless link environment often is influenced heavily by reliability and interference.

One conventional way of estimating wireless link quality uses the measured packet delivery ratio to represent the link quality of a particular wireless link. To support link quality measuring, unicast probing packets are usually used to probe link's packet delivery ratio.

However, link quality estimation based on the packet delivery ratio cannot reflect how busy the link environment is. Since the physical layer has built-in mechanisms to avoid transmission conflicts, the packet deliver ratio may be quite high, even though the link environment is very poor.

Moreover, the conventional way of estimating wireless link quality does not consider the influence of transmission rate on the link quality. For example, assuming that at the beginning of data transmission, payload packets are transmitted at a high transmission rate. Subsequently, the link environment deteriorates. Accordingly, the transmission rate is adjusted to a lower transmission rate. On the other hand, the packet delivery ratio at a low transmission rate may be higher than at the packet delivery ratio at a high transmission rate. As a result, when the link environment becomes worse, the estimation of link quality using conventional way can actually get better instead of reflecting the worsened link environment. Under these circumstances, the conventional assessment of wireless link quality cannot accurately measure the actual wireless link quality.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to channel scanning in discovery stage of fast roaming in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to wireless link quality measurement in wireless networks. In particular, the present disclosure relates to improving estimation of link quality for a wireless link between two wireless nodes when the wireless link environment changes in a wireless network.

According to embodiments of the present disclosure, wireless link quality is calculated based on throughput estimation, which takes into account changes in transmission rates. The transmission rate is capable of being self-regulated. Specifically, when the link environment changes, such as RSSI altering, signal interference, etc., the transmission rate will make corresponding adjustment automatically. Thus, the selection of transmission rate in part reflects quality of the current link environment.

In some embodiments, the disclosed method estimates packet delivery ratio with unicast probing packets and normal traffic packets. Whether a network device shall send unicast probing packets may depend on existence of normal payload packets. In some embodiments, the uncast probing packets are sent only when no normal payload packets are to be transmitted.

To estimate wireless link quality, the network device first samples packets' transmission information at each of a plurality of transmission rates. Next, the network device calculates packet delivery ratio with respect to each transmission rate, and estimates average throughput at least based on transmission rates and related packet delivery ratio in current environment. Then, the network device calculates wireless link quality percentage as an $\alpha/\beta$ ratio, where $\alpha$ indicates the estimated average throughput in current environment, and $\beta$ indicates maximum valid throughput in the ideal environment.

With the solution provided herein, a disclosed network device retrieves or samples a plurality of packet transmission data corresponding to a plurality of transmission rates at which packets are transmitted over a wireless link between two wireless nodes in a wireless network. The network device then determines a wireless link quality metric value corresponding to the wireless link at least based on (a) an average throughput associated with the plurality of transmission rates and (b) a maximum throughput corresponding to a hardware component in at least one of the two wireless nodes, wherein the average throughput is determined based in part on a plurality of packet delivery ratios. The wireless link quality metric value calculated according to the present disclosure can accurately reflect real-time link quality despite of changes in link environment and varied packet transmission rates as a result of network physical layer's conflict avoiding mechanism. Such wireless link quality metric may be used in either monitoring or managing the wireless network.

Computing Environment

Figure 1:
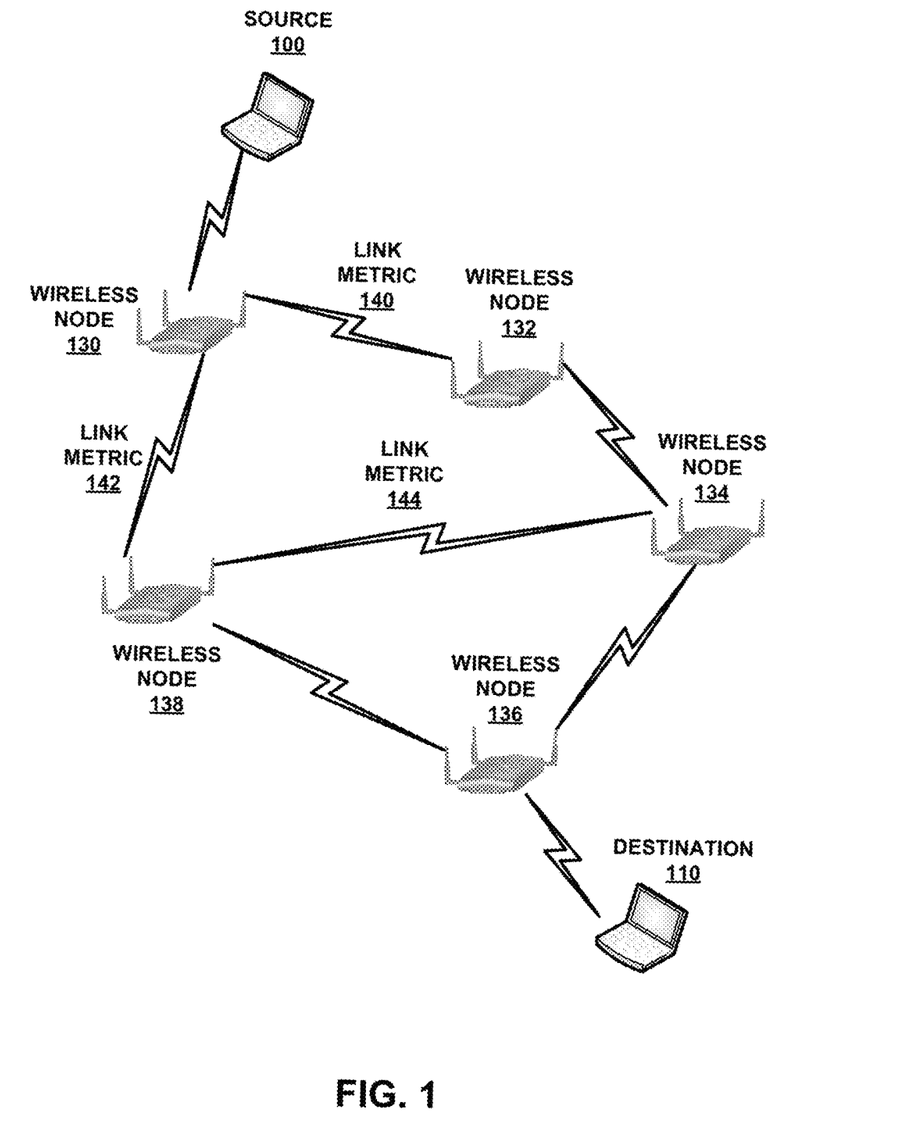
FIG. 1 is a diagram illustrating an exemplary wireless network environment according to embodiments of the present disclosure.

FIG. 1 shows an exemplary wireless digital network environment according to embodiments of the present disclosure. FIG. 1 includes a source digital device 100, a destination digital device 110, and a plurality of wireless network devices at wireless nodes 130-138. Moreover, a network device may be connected to one or more client devices via wireless or wired connections. For example, as illustrated in FIG. 1, the network device at wireless node 130 is connected to source digital device 100 via wireless connections. Likewise, the network device at wireless node 136 is connected to destination digital device 110.

Moreover, the plurality of wireless nodes 130-138 may be interconnected to each other via wireless links or wired connections. For example, in FIG. 1, through various wireless links, wireless node 130 is connected to wireless nodes 132 and 138; wireless node 132 is connected to wireless nodes 130 and 134; wireless node 134 is connected to wireless nodes 132, 136, and 138; wireless node 136 is connected to wireless nodes 134 and 138; wireless node 138 is connected to wireless nodes 130, 134 and 136; etc.

Each wireless link between two wireless nodes can be measured by a wireless link quality metric. For illustration purposes only, in FIG. 1, the wireless link between wireless nodes 130 and 132 is associated with link metric 140; the wireless link between wireless nodes 130 and 138 is associated with link metric 142; the wireless link between wireless nodes 134 and 138 is associated with link metric 144; etc.

When a packet to destination digital device 110 is received from source digital device 100 by wireless node 130, wireless node 130 dynamically selects a network device at the next hop to forward the packet. For example, wireless node 130 may compare link metric 140 with link metric 142. If link metric 140 indicates a better quality, wireless node 130 will select wireless node 132 as the next hop and forward the packet to wireless node 132. Therefore, accurate and reliable wireless link quality estimation results in better routes being selected for transmission of packets.

The network depicted in FIG. 1 may operate on a private network including one or more local area networks. The local area networks may be adapted to allow wireless access, thereby operating as a wireless local area network (WLAN). Moreover, the network may include a wired or wireless distribution system. In some embodiments, the network may be a wireless mesh network, In addition, network depicted in FIG. 1 may include multiple network control plane devices, such as network controllers, switches, routers, etc. Network control plane devices can provide functions, such as creating and enforcing network policies, providing adaptive radio management, intrusion prevention, quality of service, and/or mobility, etc.

Packet Transmissions in Varied Link Environments

Figure 2A:
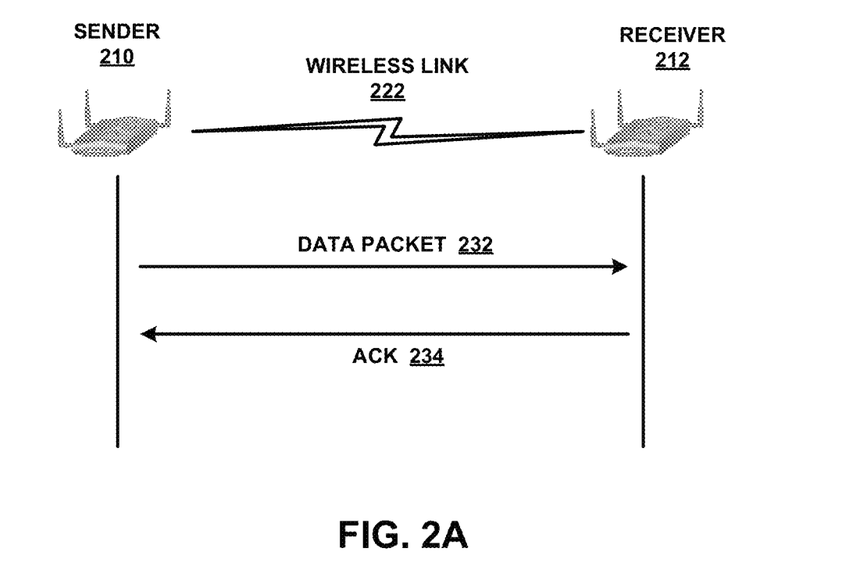
FIGS. 2A-2C are sequence diagrams illustrating exemplary link quality measurement in various link environments in a wireless network according to embodiments of the present disclosure.
Figure 2B:
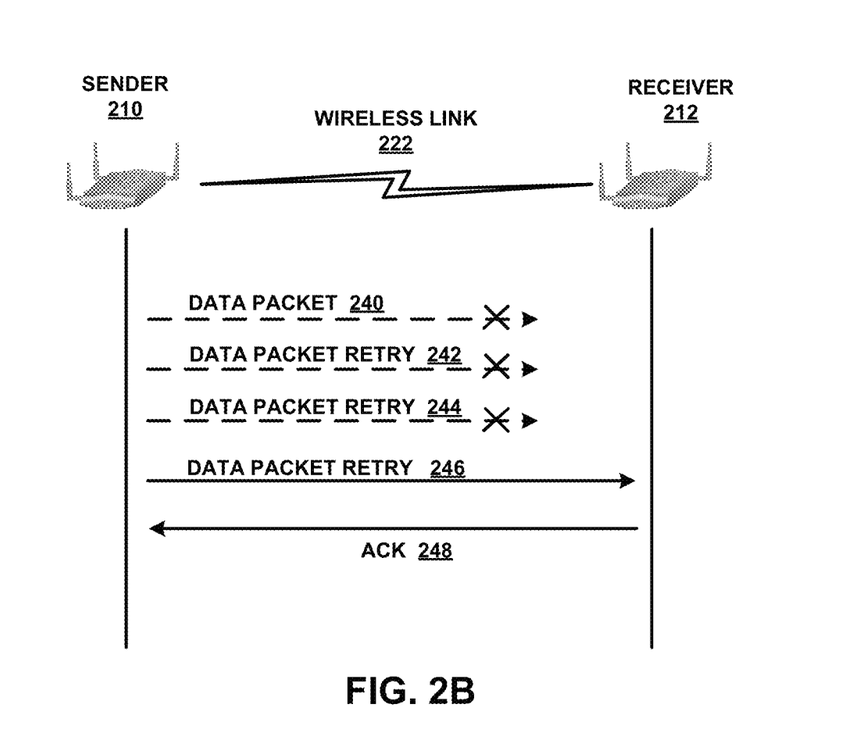
Figure 2C:
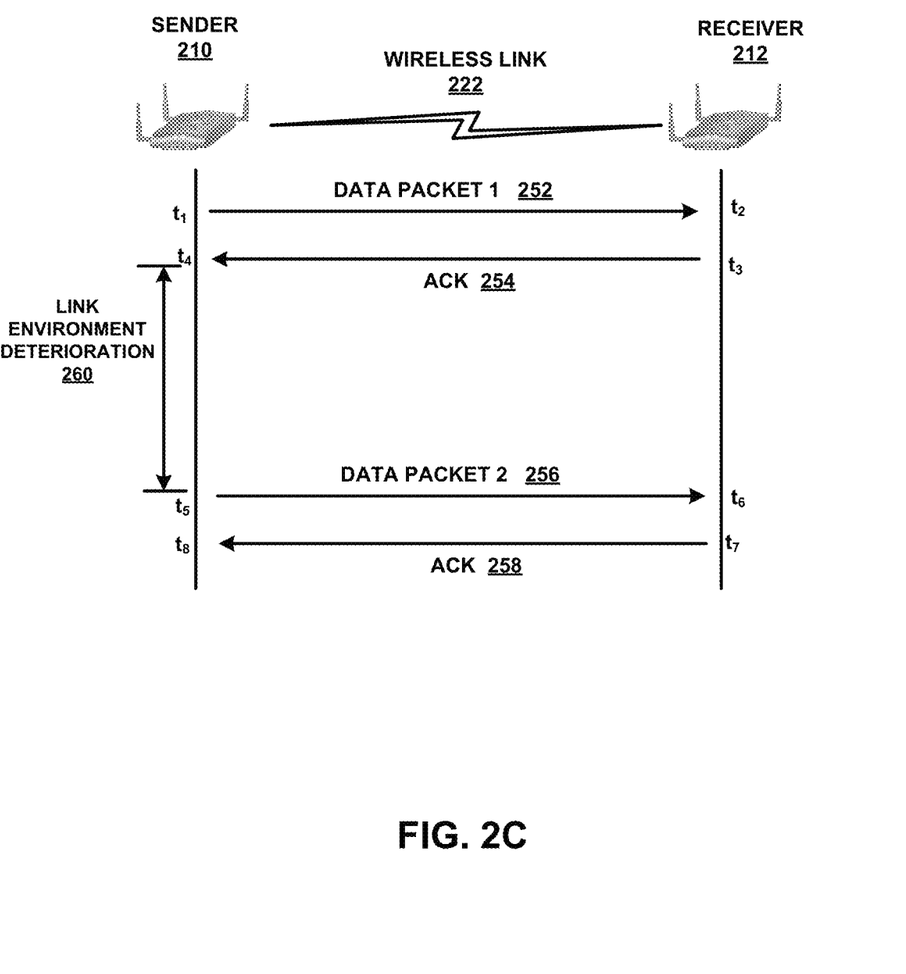

FIGS. 2A-2C illustrates exemplary link quality measurement in various link environments in a wireless network. Specifically, FIG. 2A illustrates a successful transmission of packet in a good link environment. FIG. 2A includes at least a sender device 210 and a receiver device 212. Sender device 210 and receiver device 212 both are wireless nodes in the wireless network, and are interconnected via wireless link 222. In a good link environment, when sender device 210 sends a data packet 232 to receiver device 212, receiver device 212 will receive data packet 232 successfully and sends back an acknowledgement message, e.g., ACK 234.

FIG. 2B illustrates packet transmissions in a poor link environment. Specifically, FIG. 2B includes at least a sender device 210 and a receiver device 212. Sender device 210 and receiver device 212 both are wireless nodes in the wireless network, and are interconnected via wireless link 222. In a poor link environment, when sender device 210 sends a data packet 240 to receiver device 212, receiver device 212 may not be able to receive data packet 240 due to poor link quality. After a period of time without receiving the acknowledgement message from receiver device 212, sender device 210 will retransmit data packet 242 to receiver device 212. When the link environment is very poor, e.g. with radio interferences or heavy load, the retransmitted data packet 242 may not be delivered successfully to receiver device 212 either. Thus, sender device 210 will need to retry a few times (e.g., data packet retry 242, data packet retry 244, data packet retry 246, etc.) before the data packet is delivered successfully to receiver device 212. In the illustrated example, receiver device 212 receives the data packet after the third retry, and sends back an acknowledgement message, e.g., ACK 248. Therefore, the delivery ratio used to calculate link quality metric decreases as the link environment becomes poor. As such, the link quality metric value decreases accordingly to reflect the worsened link environment.

FIG. 2C illustrates packet transmissions with transmission rate adjustment as a result of changes in link environment. Specifically, FIG. 2C includes at least a sender device 210 and a receiver device 212. Sender device 210 and receiver device 212 both are wireless nodes in the wireless network, and are interconnected via wireless link 222.

In this example, the initial link environment is good. Thus, initially sender device 210 sends data packet 1 252 at a high transmission rate to receiver device 212 at time point $t_1$, receiver device 212 will receive data packet 254 successfully at time point $t_2$ and sends back an acknowledgement message, e.g., ACK 254, at time point t3. ACK 254 is received by sender device 210 at time point $t_4$.

For illustration purposes only, assuming that the link environment deterioration 260 occurs between time point $t_4$ and time point $t_5$. As a result, data packet 2 256 is transmitted at a low transmission rate to receiver device 212 at time point $t_5$. After receiver device 212 receives data packet 2 256 at time point $t_6$, receiver device 212 sends an acknowledgement message, e.g., ACK 258, at time point $t_7$. The acknowledgement message is received successfully by sender device 210. Thus, the packet delivery ratio remains high as a result of successful delivery of data packets at an adjusted lower rate. However, the high packet delivery ratio is not indicative of a good link environment in this case.

Wireless Link Quality Measurement

Figure 3:
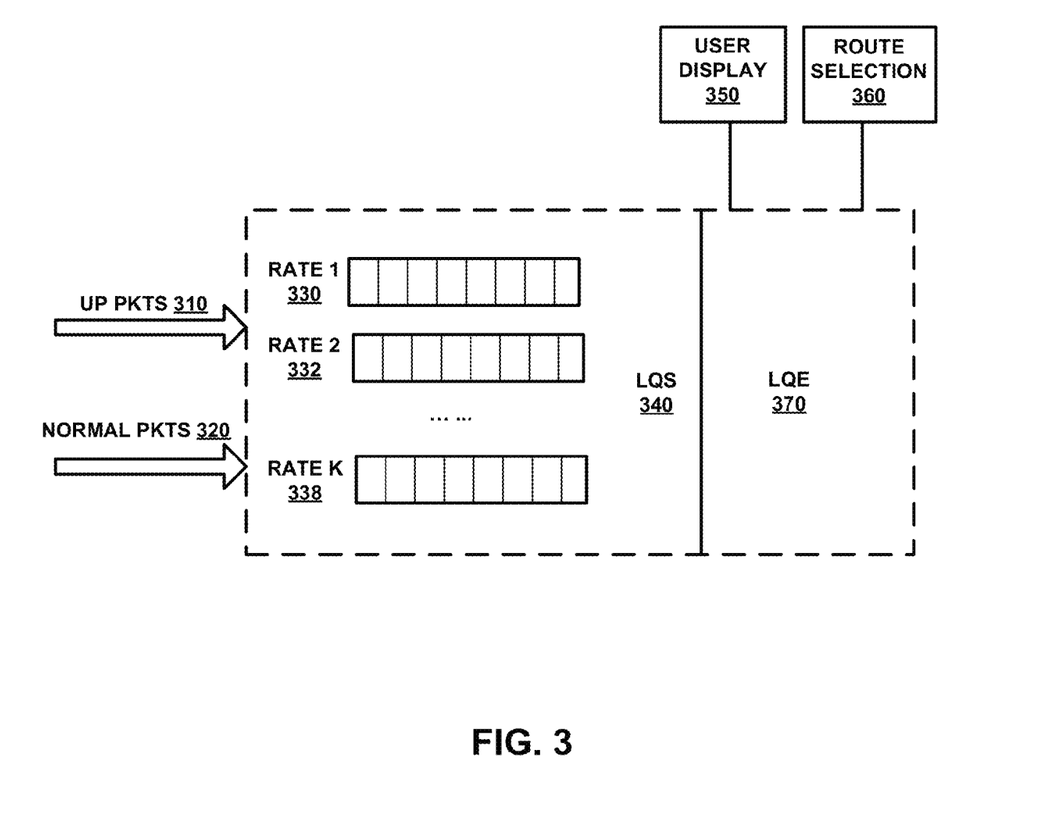
FIG. 3 illustrates an exemplary wireless link quality measuring mechanism in a wireless network according to embodiments of the present disclosure.

FIG. 3 illustrates an exemplary wireless link quality measuring mechanism in a wireless network. FIG. 3 includes user display 350, route selection mechanism 360, and a link quality measuring mechanism that further includes at least link quality statistics (LQS) portion 340 and link quality estimation (LQE) portion 370.

In FIG. 3, the link quality measuring mechanism estimates the node-to-node link quality in wireless networks. In some embodiments, the process of link quality estimation can be completed in a wireless node that sends the packets.

After a packet is transmitted, data related to the packet transmission will be entered into LQS 340, which computes statistical information of the packet transmission data. Such packet transmission data may include, but is not limited to, transmission rate, the number of retransmissions, backoff time from previous transmissions when applicable, succeed or fail outcomes, etc. In some embodiments, the packet can be a data packet including payload information. In other embodiments, the packet may be a unicast control packet including a probing message. In some embodiments, LQS 340 samples packet transmission data at various transmission rates, such as, rate 1 330, rate 2 332, ... rate K 338.

LQE 370 integrates information of transmission data at various transmission rates as provided by LQS 340, and estimates the wireless link's quality using formulas described later in this disclosure. In some embodiments, LQE 370 may be used on-demand. The on-demand request can be received from, for example, user display 350, or route selection mechanism 360. In some embodiments, a network administrator may want to monitor the link quality on a user interface, or check on the link quality of a particular wireless link. The network administrator will be able to receive wireless link quality estimation provided by LQE 370 through user display 350. In other embodiments, a wireless node may need to update its routes, for example, when network topology changes. In order to do so, the wireless node can request link quality estimations from LQE 370 via route selection mechanism 360.

A. Link Quality Statistics

For each transmission rate, there can be a storage used to store statistics information within a packet statistics period (PSP). In some embodiments, LQS 340 only stores the statistics information corresponding to the latest transmission period of time, which can be PSP. In particular, a continuous transmission timeline within PSP can be divided into a plurality of small transmission time slices. LQS 340 may use one memory unit to store the packet transmission result within each small transmission time slice. LQE 370 will choose all of the memory units within the PSP to calculate the packet delivery ratio.

After each packet is transmitted, LQS 340 will perform statistical calculation of the transmission result. For example, LQS 340 can calculate statistical information, such as transmission rate, the number of retransmissions, backoff time from previous transmissions when applicable, succeed or fail outcomes, etc.

In addition, LQS 340 will index the memory unit by transmission rate and/or transmission time. After calculating the transmission result, LQS 340 adds the transmission result to a corresponding counter in the indexed memory unit based on the transmission rate and/or transmission time associated with the current packet transmission.

Note that, the transmitted packets can be either normal traffic packets 320, or unicast probe packets 310. In some embodiments, when there is no normal traffic packet 320 to be transmitted over the wireless link, the wireless node may send a unicast probing packet 310 to test the link quality during that particular period. By sampling a combination of normal packets and unicast probing packets, the wireless link quality measuring mechanism based on LQS 340 and LQE 370 usually work well even in the absence of active traffic over the link, and thus providing dynamic real-time estimation of the wireless link quality.

More specifically, each wireless node may maintain a timer, which triggers the unicast packet probing mechanism. The timer may be pre-configured by a network administrator based on the network environment, topology, conditions, etc. When the pre-configured time set by the timer expires, the sending wireless node checks whether any traffic packets have been transmitted during the last time slice or PSP. If no traffic has been transmitted, the sending wireless node will send a plurality of unicast probe packets to the receiving wireless node of the wireless link.

The number of unicast probe packets and the transmission rates at which they will be sent can be determined at least in part based on previous transmission results stored in the memory units. In some embodiment, the wireless link quality measuring mechanism will determine a total number of unicast probing packets to be transmitted to the receiving wireless node, how many groups the unicast probing packets will be transmitted, how many unicast probing packets will be transmitted within each group, the transmission rate at which each group of the unicast probing packets will be sent, etc.

B. Link Quality Estimation

The link quality estimation by LQE 370 as disclosed herein is based on throughput estimation. The hardware transmission rate indicates the hardware's maximum ideal throughput. However, the real throughput is usually lower than the hardware transmission rate. For example, when the hardware transmission rate is 300 Mbps, the real valid throughput may be merely 220 Mbps even in an ideal link environment. Therefore, LQE 370 uses the valid throughput instead of the hardware transmission rate to estimate wireless link quality metrics.

The link quality estimation disclosed in the present disclosure maintains a corresponding valid throughput for each hardware transmission rate. The valid throughput indicates the maximum throughput with a specific hardware transmission rate in an ideal environment.

Moreover, in some embodiments, the valid throughput estimation is performed based on the assumption that there is no contention on wireless transmission channel, and thus the wireless node sends maximum transmission units (MTU).

Figure 4:
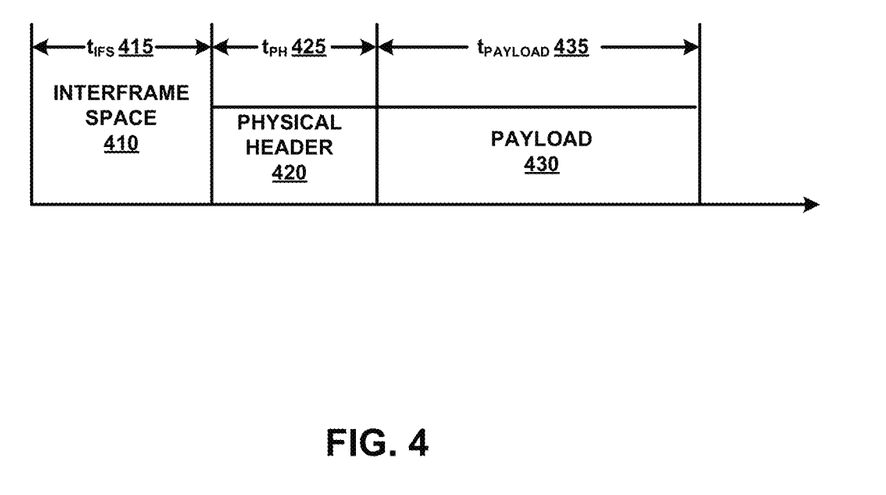
FIG. 4 illustrates exemplary parameters used in calculating link quality metric in a wireless network according to embodiments of the present disclosure.

FIG. 4 illustrates exemplary parameters used in calculating link quality metric in a wireless network. Specifically, FIG. 4 includes at least $t_{IFS}$ 415, $t_{PH}$ 425, $t_{payload}$ 435, etc. $t_{IFS}$ 415 corresponds to the time period associated with inter frame transmission space 410, which is associated with the lapse time between transmissions of a first packet and a subsequent packet. $t_{PH}$ 425 corresponds to the time period associated with transmission of physical header 420. $t_{payload}$ 435 corresponds to the time period associated with transmission of payload 430.

For a specific hardware transmission rate, the valid throughput estimation is calculated according to the following:

$$Throughput_{valid} = \frac{MTU bytes \times 8 bits}{t_{IFS} + t_{PH} + t_{payload}}$$

where $t_{IFS}$ indicates the time of inter frame space; $t_{PH}$ indicates the transmission time of the physical header; and, $t_{payload}$ indicates the transmission time of the payload. Usually, $t_{IFS}$ and $t_{PH}$ are fixed once the wireless mode is set.

However, the transmission time of the payload $t_{payload}$ varies with hardware transmission rate.

Specifically, the transmission time of the payload $t_{payload}$ can be determined as the following:

$$t_{payload} = \frac{L_{payload}}{R_{hardware}}$$

Here, $L_{payload}$ is the total length of packets, which include both the physical header and the payload; $R_{hardware}$ is the hardware transmission rate.

By applying the above equations to various hardware transmission rates and wireless modes, the link quality measuring mechanism can acquire valid throughputs, which correspond to each related transmission rate per wireless mode.

For illustration purposes only, assuming that there are K different transmission rates. At each transmission rate, the storage or database records the packets transmission information within the PSP. Because retransmitted packets consume bandwidth of wireless channels, should the retransmitted packets failed to be delivered successfully, the failure will be accounted as a transmission failure. For instance, when transmitting a packet, a wireless node retries 4 times and finally succeeds at the transmission on the 4th retransmission. In this example, for the purpose of calculating link quality metrics, unlike conventional methods, the link quality measuring mechanism will treat the original packet transmission and the 4 subsequent retransmissions of the same packet as if 5 distinct packets have been transmitted over the wireless channel with 1 packet successfully delivered and 4 packet delivery failures.

The following formula is used to calculate total packets number within PSP:

$$N_{sum} = \sum_{i=1}^{K} S_i + F_i$$

where $S_i$ is total number of transmission success within PSP, $F_i$ represents total number transmission failure within PSP, which includes retransmission times.

Usually the numbers of the transmission packets at each transmission rate is not the same within the PSP. Thus, a greater number of packets transmitted at a specific transmission rate usually is associated with a higher weight. Accordingly, numbers of transmission packets are used as a weighing factor when calculating the average throughput. The weights are represented by $\alpha_i$ below:

$$\alpha_i = \frac{S_i + F_i}{N_{sum}}$$

In the present disclosure, packet delivery ratio is calculated with respective to each of the different transmission rates at which packets are transmitted. Furthermore, the packet delivery ratio in the i transmit rate is given by $$E_i = \frac{S_i}{S_i + F_i}$$

where $E_i$ is packets delivery ratio of the i transmit rate.

When transmitting each packet, the sender wireless node chooses a transmission rate as it deems most appropriate. As a result, the valid throughput corresponding to the transmission rate can approximately represent real maximum throughput in the current link environment, even though the traffic is very low.

The average throughput depends on valid throughputs at various transmission rates, while packet delivery ratio is considered. The average throughput can be estimated by the following:

$$R_{avg} = \sum_{i=1}^{K} [R_{vaid(i)} \times E_i \times \alpha_i]$$

Put parameter $\alpha_i$ and $E_i$ into above equation, the above formula can be simplified as the following:

$$R_{avg} = \sum_{i=1}^{K} \left[ R_{vaid(i)} \times \frac{S_i}{N_{sum}} \right]$$

Finally, the disclosed link quality measuring mechanism calculates the wireless link quality by computing a ratio between the average throughput and the maximum ideal throughput.

$$\text{Link\_quality} = \frac{R_{avg}}{R_{max\_valid}} \times 100$$

where Link_quality indicates a percentage value associated with the wireless link quality; $R_{avg}$ indicates the average throughput of packet transmissions at various transmission rates; and, $R_{max\_valid}$ indicates the maximum ideal throughput as determined by the hardware.

In some embodiments, the throughput-based link quality measuring mechanism as disclosed in the present disclosure estimates the average throughput in the current link environment. In some embodiments, the throughput-based link quality measuring mechanism can also expect real throughput in the current link environment to facilitate route selection as needed in, for example, wireless mesh networks.

Experiment Results of Wireless Link Quality Metric

Figure 5:
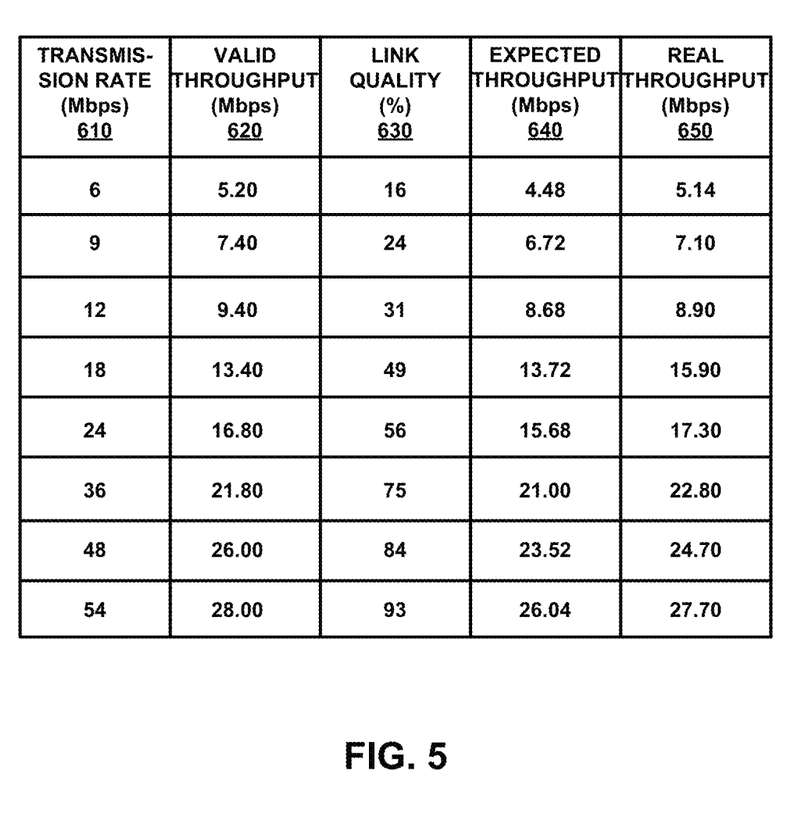
FIG. 5 illustrates exemplary results using wireless link quality metric according to embodiments of the present disclosure.

FIG. 5 illustrates an exemplary results using wireless link quality metric according to embodiments of the present disclosure. FIG. 5 includes transmission rate (in Mbps) 610, valid throughput (in Mbps) 620, link quality (in percentage) 630, expected throughput (in Mbps) 640, and real throughput (in Mbps) 650.

In the depicted example, the sending wireless node and the receiving wireless node were initially configured to work on IEEE 802.11a mode, and to form a wireless distribution system (WDS) link. Then, the current link environment of the WDS link is artificially changed such that the transmission rate is adjusted gradually from a low transmission rate to a high transmission rate. For each adjusted transmission rate, the system records a link quality percentage of the sending wireless node, tests the maximum throughput from the sending wireless node to the receiving wireless node, and records the real throughput in specific transmission rates. The obtained results are illustrated in the table in FIG. 5.

The item Expect IPUT is calculated by:

$$\text{Expect\_IPUT} = R_{max\_valid} \times \text{link\_quality} \times 100$$

where $R_{max\_valid}$ is ideal maximum throughput. In the example illustrated in FIG. 5, the ideal maximum throughput is 28.00 Mbps. From the table illustrated in FIG. 5, the system can extract wireless link quality metric values, including but not limited to, link quality percentage; expect throughput; real throughput; etc.

Figure 6:
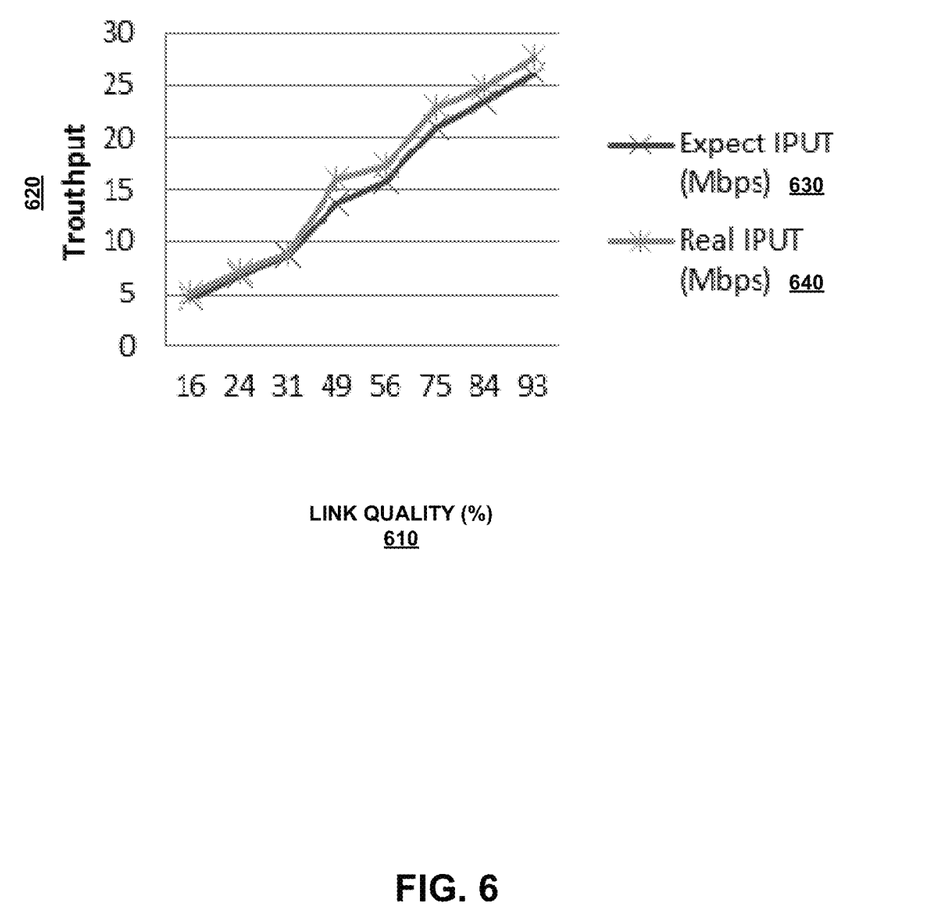
FIG. 6 is a line chart illustrating exemplary results using wireless link quality metric according to embodiments of the present disclosure.

FIG. 6 is a line chart illustrating exemplary results using wireless link quality metric. Specifically, FIG. 6 illustrates wireless link quality metric values in a line chart according to FIG. 5. The horizontal axis indicates link quality (in percentage) 610, and the vertical axis indicates throughput (in Mbps) 620. The top line illustrates the real throughput (i.e., Real IPUT in Mbps) 640, whereas the bottom line illustrates the expected throughput (i.e., Expect IPUT in Mbps) 630. As clearly shown in FIG. 6, the expected throughput is a curve approximation to the real throughput. Hence, the throughput-based wireless link quality measuring mechanism disclosed herein is proved to reflect the current link environment more accurately than conventional metrics primarily based on packet delivery ratios.

Processes for Measuring Wireless Link Quality in Wireless Networks

Figure 7:
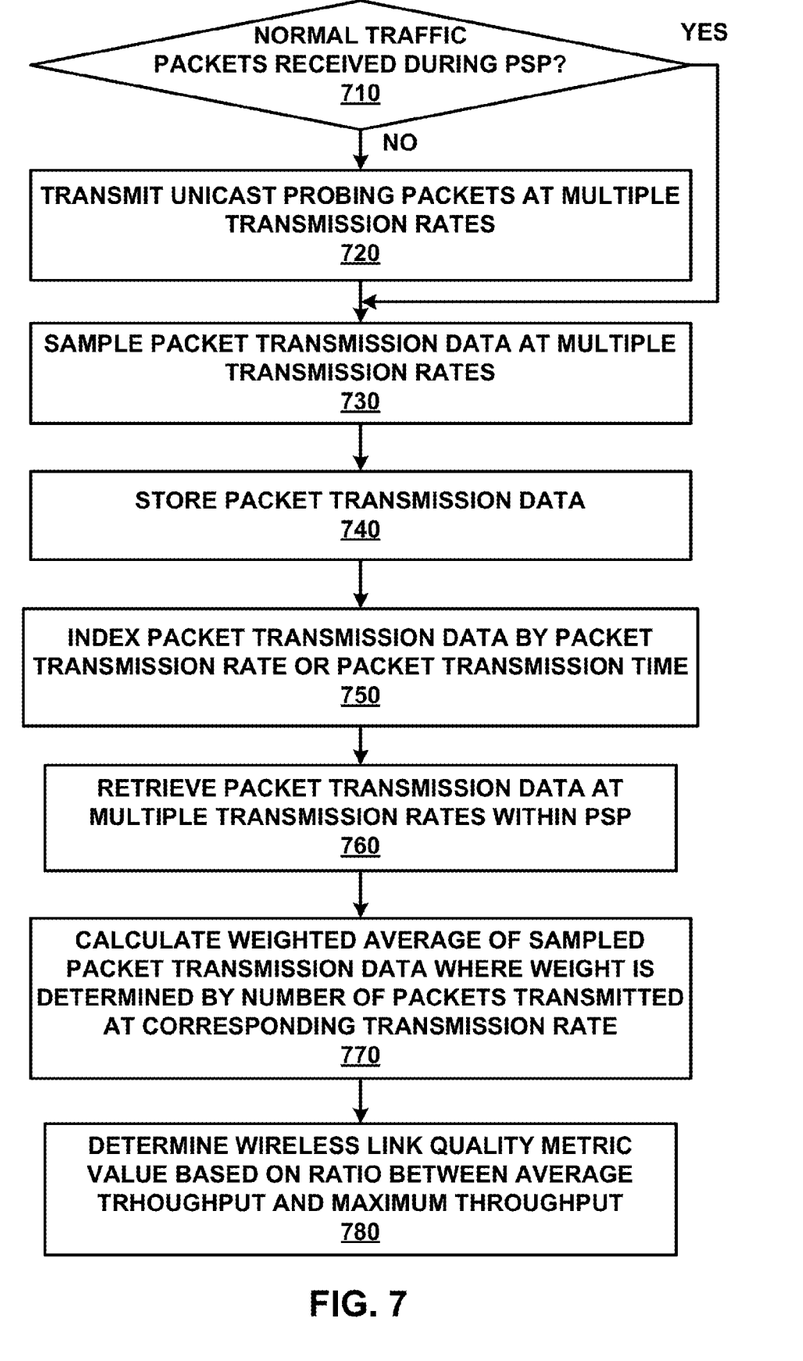
FIG. 7 is a flowchart illustrating exemplary wireless link quality measurement in a wireless network according to embodiments of the present disclosure.

FIG. 7 is a flowchart illustrating exemplary process of measuring wireless link quality in wireless networks according to embodiments of the present disclosure. Note that, not all of the operations illustrated in FIG. 7 are mandatory operations in measuring wireless link quality. In some embodiments, the wireless network is a wireless mesh network; and, the wireless link comprises a wireless distribution system (WDS) link.

First, the disclosed network device determines whether normal traffic packets are received during a packet statistical period (PSP) (operation 710). If not, the network device transmits a plurality of unicast probing packets at multiple transmission rates on the wireless link (operation 720). In some embodiments, the unicast probing packets are transmitted in groups. Further, the network device determines one or more of: (i) a total number of unicast probing packets to be transmitted to a wireless node, (ii) a total number of groups that the unicast probing packets are transmitted in, (iii) numbers of unicast probing packets to be transmitted within each group, and (iv) transmission rates at which each group of the unicast probing packets is to be sent. Also, note that, the transmission rate at which a packet is transmitted may be adjusted in response to a link environment change (for example, as influenced by interference level, channel load, etc.) on the wireless link.

If normal traffic packets are received or after unicast probing packets are transmitted, the network device next samples packet transmission data at multiple transmission rates (operation 730). In some embodiments, the sampled packet transmission data includes one or more of: a packet delivery ratio, a packet transmission rate, a total number of retransmissions, a backoff time from previous transmissions, and a transmission outcome.

Moreover, the network device may optionally store the packet transmission data (operation 740). Specifically, the network device may divide the PSP into multiple transmission time slices, and store the packet transmission data corresponding to each transmission time slice in a unique storage unit. Furthermore, the network device can index the storage units based on packet transmission rate or packet transmission time, or both (operation 750).

Also, the network device can retrieve packet transmission data at multiple transmission rates within PSP (operation 760). In some embodiments, the network device retrieves the packet transmission data in response to an inquiry received via a user interface. In other embodiments, the network device retrieves the packet transmission data when it needs to select or update a route.

Next, the network device calculates a weighted average of sampled packet transmission data, where the weight is determined based on at least the number of packets transmitted at a corresponding transmission rate (operation 770). Thus, the more packets transmitted at a specific transmission rate, the more weight is given to the sampled packet transmission data associated with the specific transmission rate. Note that, while determining one or more of the packet delivery ratio and the transmission outcome, each retransmission of a previously transmitted packet is treated as a new transmission, and thereby mitigating network physical layer's built-in mechanism for avoiding conflicts.

In addition, the network device determines a wireless link quality value based on a ratio between an average throughput and a maximum throughput (operation 780). The average throughput is further determined based on valid throughputs corresponding to the plurality of transmission rates. Here, a valid throughput indicates an approximate maximum throughput at a respective transmission rate in current link environment of the wireless link. The valid throughputs are estimated at least based on time of an inter frame space between transmissions of a first packet and a subsequent packet, transmission time of a physical header of a packet, and transmission time of payload data of the packet. Moreover, the transmission time of payload data of the packet is determined based on at least a total length associated with the packet and a hardware transmission rate.

Systems for Measuring Wireless Link Quality in Wireless Networks

Figure 8:
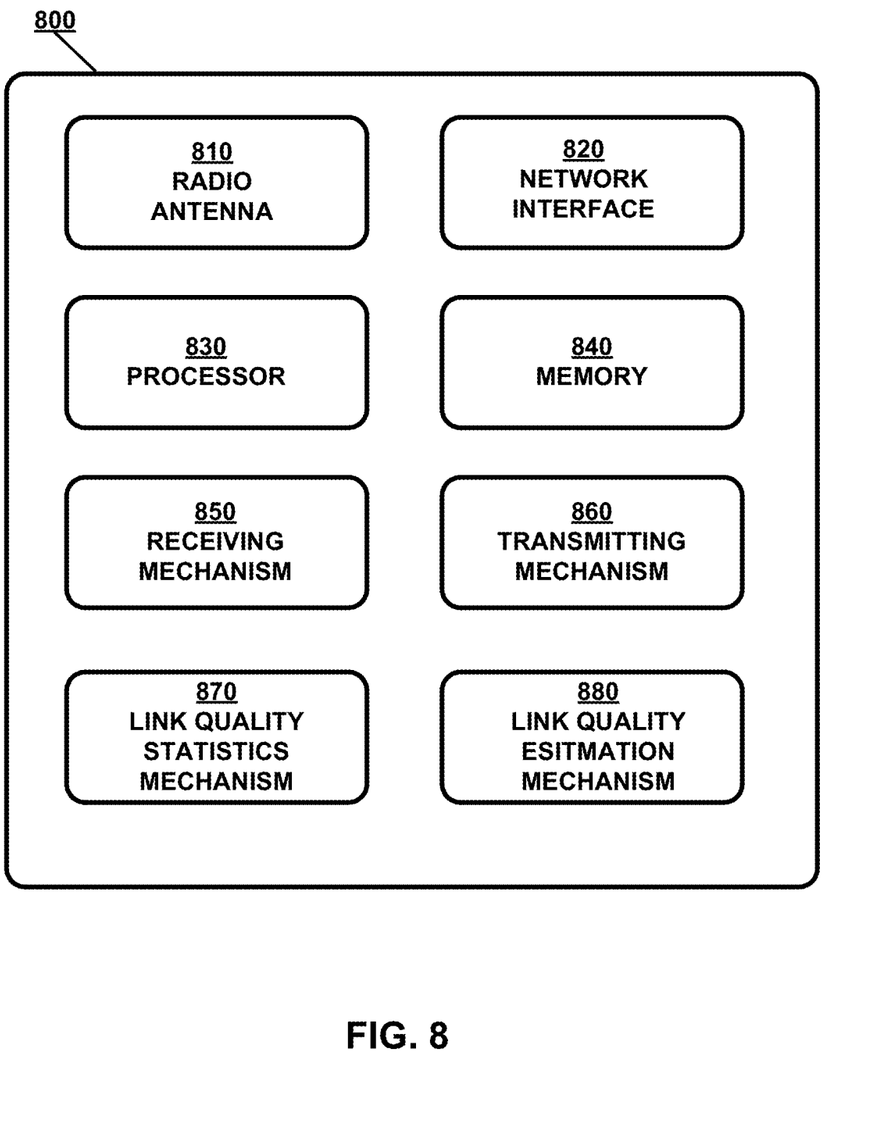
FIG. 8 is a block diagram illustrating exemplary system for wireless link quality measurement in a wireless network according to embodiments of the present disclosure.

FIG. 8 is a block diagram illustrating a network device system for measuring wireless link quality in wireless networks according to embodiments of the present disclosure.

Network device 800 includes at least one or more radio antennas 810 capable of either transmitting or receiving radio signals or both, a network interface 820 capable of communicating to a wired or wireless network, a processor 830 capable of processing computing instructions, and a memory 840 capable of storing instructions and data. Moreover, network device 800 further includes a receiving mechanism 850, a transmitting mechanism 860, a link quality statistics mechanism 870, and a link quality estimation mechanism 880, all of which are coupled to processor 830 and memory 840 in network device 800. Network device 800 may be used as a client system, or a server system, or may serve as node in a distributed or a cloud computing environment.

Radio antenna 810 may be any combination of known or conventional electrical components for receipt of signaling, including but not limited to, transistors, capacitors, resistors, multiplexers, wiring, registers, diodes or any other electrical components known or later become known.

Network interface 820 can be any communication interface, which includes but is not limited to, a modem, token ring interface, Ethernet interface, wireless IEEE 802.11 interface (e.g., IEEE 802.11n, IEEE 802.11ac, etc), cellular wireless interface, satellite transmission interface, or any other interface for coupling network devices. In some embodiments, network interface 820 may be software-defined and programmable, for example, via an Application Programming Interface (API), and thus allowing for remote control of the network device 800.

Processor 830 can include one or more microprocessors and/or network processors. Memory 840 can include storage components, such as, Dynamic Random Access Memory (DRAM), Static Random Access Memory (SRAM), etc.

Receiving mechanism 850 generally receives one or more network messages via network interface 820 from a distribution system or radio antenna 810 from a wireless client over a wireless communication channel. The received network messages may include, but are not limited to, requests and/or responses, beacon frames, management frames, control path frames, and so on. Each message may comprise one or more data packets, for example, in the form of IP packets.

Transmitting mechanism 860 generally transmits messages, which include, but are not limited to, requests and/or responses, beacon frames, management frames, control path frames, and so on. In some embodiments, transmission mechanism 860 can transmit a plurality of unicast probing packets at the plurality of transmission rates, and thereby allowing real-time estimation of link quality of the wireless link in absence of traffic packets. Note that, in some circumstances, transmitting mechanism may adjust a transmission rate at which a packet is to be transmitted in response to a link environment change on the wireless link.

Link quality statistics mechanism 870 generally generates statistical information of packet transmission data. Specifically, link quality statistics mechanism 870 retrieves a plurality of packet transmission data corresponding to a plurality of transmission rates at which packets are transmitted over a wireless link between two wireless nodes in a wireless network.

Optionally, link quality statistics mechanism 870 may also determine whether a traffic packet is received within the PSP. If not, transmission mechanism 860 will transmit a plurality of unicast probing packets at the plurality of transmission rates. In such cases, link quality statistics mechanism 870 further determines one or more of: (i) a total number of unicast probing packets to be transmitted to a wireless node, (ii) a total number of groups that the unicast probing packets are transmitted in, (iii) numbers of unicast probing packets to be transmitted within each group, and (iv) transmission rates at which each group of the unicast probing packets is to be sent.

Link quality estimation mechanism 880 generally estimates wireless link quality. Specifically, link quality estimation mechanism 880 determines a wireless link quality metric value corresponding to the wireless link at least based on (a) an average throughput associated with the plurality of transmission rates and (b) a maximum throughput corresponding to a hardware component in at least one of the two wireless nodes. The average throughput is determined based in part on a plurality of packet delivery ratios and valid throughputs corresponding to the plurality of transmission rates. Further, the valid throughput indicates an approximate maximum throughput at a respective transmission rate in current link environment of the wireless link. The valid throughputs can be estimated at least based on time of an inter frame space between transmissions of a first packet and a subsequent packet, transmission time of a physical header of a packet, and transmission time of payload data of the packet. Moreover, the transmission time of payload data of the packet is determined based on at least a total length associated with the packet and a hardware transmission rate.

Therefore, receiving mechanism 850, transmitting mechanism 860, link quality statistics mechanism 870, and link quality estimation mechanism 880 often collectively operate with each other to improve performance of client devices during discovery stage of their fast roaming in wireless networks.

According to embodiments of the present disclosure, network services provided by wireless network device 800, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A computer-implemented method, comprising:
retrieving, by a network device on a network, packet transmission data for a set of packets transmitted on the network, wherein a packet is transmitted on the network at a transmission rate;
calculating packet delivery ratios for at least two subsets of packets of the set of packets, wherein packet delivery ratios are calculated using packet transmission data, and wherein each subset of packets is transmitted at a different transmission rate;
determining a weight for each of the at least two subsets of packets, wherein a weight is determined using a total number of packets transmitted at a transmission rate and a total number of packets transmitted across the set of transmission rates;
calculating a weighted average throughput for the at least two subsets of packets, wherein the weighted average throughput is calculated using the packet delivery ratios of the at least two subsets of packets and the weights of the at least two subsets of packets;
calculating a network link quality based on the weighted average throughput; and
managing, by the network device, selection of routes for transmission of packets in the network based upon the calculated network link quality.

2. The method of claim 1, wherein calculating the network link quality includes computing a ratio between the calculated weighted average throughput and a maximum ideal throughput.

3. The method of claim 1, wherein the network is a wireless network and the packets are transmitted over a wireless link within a packet statistical period (PSP) indicating a packet sampling time period.

4. The method of claim 3, further comprising:
determining, by the network device, whether a traffic packet is received within the PSP; and
in response to no traffic being receiving in the PSP, transmitting a set of unicast probing packets at the plurality of transmission rates, thereby allowing real-time estimation of network link quality of the wireless link in absence of the traffic packet.

5. The method of claim 4, further comprising:
adjusting a transmission rate at which a probing packet is to be transmitted based on the calculated network link quality.

6. The method of claim 4, further comprising:
adjusting a transmission rate at which a probing packet is to be transmitted in response to a change in link environment on the network.

7. The method of claim 1, wherein calculating the packet delivery ratios for each subset of packets further comprises calculating the packet delivery ratios using valid throughputs, wherein the valid throughputs are determined using time between transmissions of an initial packet and a subsequent packet of the set of packets, transmission time of a physical header of a packet, and transmission time of payload data of a packet.

8. The method of claim 1, wherein the packet transmission data comprises one or more of: a packet transmission rate, a packet transmission time, a total number of retransmissions, a backoff time from previous transmissions, and a transmission outcome.

9. The method of claim 1, wherein determining the weight for each of the at least two subsets of packets further comprises determining a weight for each of subset of packets transmitted at a transmission rate by determining, for each subset of packets, how often packets are retransmitted at the transmission rate, and wherein each retransmission of a previously transmitted packet is treated as a new transmission.

10. The method of claim 1, wherein the network comprises a wireless mesh network, and wherein the wireless mesh network includes a wireless link that comprises a wireless distribution system (WDS) link.

11. A computing device, comprising:
one or more processors; and
a memory having instructions stored thereon, which when executed by the one or more processors, cause the one or more processors to:
retrieve packet transmission data for a set of packets transmitted on the network, wherein a packet is transmitted on the network at a transmission rate;
calculate packet delivery ratios for at least two subsets of packets of the set of packets, wherein packet delivery ratios are calculated using packet transmission data, and wherein each subset of packets is transmitted at a different transmission rate;
determine a weight for each of the at least two subsets of packets, wherein a weight is determined using a total number of packets transmitted at a transmission rate and a total number of packets transmitted across the set of transmission rates;

calculate a weighted average throughput for the at least two subsets of packets, wherein the weighted average throughput is calculated using the packet delivery ratios of the at least two subsets of packets and the weights of the at least two subsets of packets;

calculate a network link quality based on the weighted average throughput; and manage selection of routes in the network for transmission of packets based upon the calculated network quality link.

12. The computing device of claim 11, wherein the instructions are further to cause the one or more processors to calculate the network link quality by computing a ratio between the calculated weighted average throughput and a maximum ideal throughput.

13. The computing device of claim 11, wherein the network is a wireless network and the packets are transmitted over a wireless link within a packet statistical period (PSP) indicating a packet sampling time period.

14. The computing device of claim 13, further comprising instructions, which when executed by the one or more processors, cause the computing device one or more processors to:

determine whether a traffic packet is received within the PSP; and in response to no traffic being receiving in the PSP, transmit a set of unicast probing packets at the plurality of transmission rates, thereby allowing real-time estimation of network link quality of the wireless link in absence of the traffic packet.

15. The computing device of claim 14, further comprising instructions, which when executed by the one or more processors, cause the one or more processors to:

adjust a transmission rate at which a probing packet is to be transmitted based on the calculated network link quality.

16. The computing device of claim 14, further comprising instructions, which when executed by the one or more processors, cause the one or more processors to:

adjust a transmission rate at which a probing packet is to be transmitted in response to a change in link environment on the network.

17. The computing device of claim 11, wherein the packet delivery ratios for each subset of packets are calculated using valid throughputs, wherein valid throughputs are determined using time between transmissions of an initial packet and a subsequent packet of the set of packets, transmission time of a physical header of a packet, and transmission time of payload data of a packet.

18. The computing device of claim 11, wherein the packet transmission data comprises one or more of: a packet transmission rate, a packet transmission time, a total number of retransmissions, a backoff time from previous transmissions, and a transmission outcome.

19. The computing device of claim 11, wherein to determine the weight for each of the at least two subsets of packets, the instructions are further to cause the one or more processors to determine, for each subset of packets, how often packets are retransmitted at the transmission rate, and wherein each retransmission of a previously transmitted packet is treated as a new transmission.

20. The computing device of claim 11, wherein the network comprises a wireless mesh network, and wherein the wireless mesh network includes a wireless link that comprises a wireless distribution system (WDS) link.

21. A non-transitory machine-readable storage medium on which is stored instructions that when executed by a data processing apparatus are to cause the data processing apparatus to:

retrieve packet transmission data for a set of packets transmitted on the network, wherein a packet is transmitted on the network at a transmission rate;

calculate packet delivery ratios for at least two subsets of packets of the set of packets, wherein packet delivery ratios are calculated using packet transmission data, and wherein each subset of packets is transmitted at a different transmission rate;

determine a weight for each of the at least two subsets of packets, wherein a weight is determined using a total number of packets transmitted at a transmission rate and a total number of packets transmitted across the set of transmission rates;

calculate a weighted average throughput for the at least two subsets of packets, wherein the weighted average throughput is calculated using the packet delivery ratios of the at least two subsets of packets and the weights of the at least two subsets of packets;

calculate a network link quality based on the weighted average throughput; and manage selection of routes for transmission of packets in the network based upon the calculated network link quality.

22. The non-transitory machine-readable storage medium of claim 21, wherein the instructions are further to cause the data processing apparatus to calculate the network link quality by computing a ratio between the calculated weighted average throughput and a maximum ideal throughput.

23. The non-transitory machine-readable storage medium of claim 21, wherein the network is a wireless network and the packets are transmitted over a wireless link within a packet statistical period (PSP) indicating a packet sampling time period.

24. The non-transitory machine-readable storage medium of claim 23, further comprising instructions that are to cause the data processing apparatus to:

determine whether a traffic packet is received within the PSP; and in response to no traffic being receiving in the PSP, transmit a set of unicast probing packets at the plurality of transmission rates, thereby allowing real-time estimation of network link quality of the wireless link in absence of the traffic packet.

25. The non-transitory machine-readable storage medium of claim 24, further comprising instructions that are to cause the data processing apparatus to:

adjust a transmission rate at which a probing packet is to be transmitted based on the calculated network link quality.

26. The non-transitory machine-readable storage medium of claim 21, further comprising instructions that are to cause the data processing apparatus to:

adjust a transmission rate at which a probing packet is to be transmitted in response to a change in link environment on the network.

27. The non-transitory machine-readable storage medium of claim 21, wherein the packet delivery ratios for each subset of packets are calculated using valid throughputs, wherein valid throughputs are determined using time between transmissions of an initial packet and a subsequent packet of the set of packets, transmission time of a physical header of a packet, and transmission time of payload data of a packet.

28. The non-transitory machine-readable storage medium of claim 21, wherein the packet transmission data comprises one or more of: a packet transmission rate, a packet transmission time, a total number of retransmissions, a backoff time from previous transmissions, and a transmission outcome.

29. The non-transitory machine-readable storage medium of claim 21, wherein to determine the weight for each of the at least two subsets of packets, the instructions are further to cause the data processing apparatus to determine, for each subset of packets, how often packets are retransmitted at the transmission rate, and wherein each retransmission of a previously transmitted packet is treated as a new transmission.

30. The computer-program product of claim 21, wherein the network comprises a wireless mesh network, and wherein the wireless mesh network includes a wireless link that comprises a wireless distribution system (WDS) link.

* * * * *